United States Patent
Lee et al.

(10) Patent No.: US 8,355,717 B2
(45) Date of Patent: Jan. 15, 2013

(54) METHOD AND SYSTEM FOR REGISTERING A SMARTCARD TERMINAL WITH A BROADCAST SERVER

(75) Inventors: Byung Rae Lee, Suwon-si (KR); Jeedigunta Venkateswar, Karnataka (IN); Pratyusha Rajendran, Karnataka (IN); Rajavelsamy R, Karnataka (IN)

(73) Assignee: Samsung Electronics Co., Ltd (KR)

( * ) Notice: Subject to any disclaimer, the term of this patent is extended or adjusted under 35 U.S.C. 154(b) by 960 days.

(21) Appl. No.: 12/415,323

(22) Filed: Mar. 31, 2009

(65) Prior Publication Data
US 2009/0247129 A1 Oct. 1, 2009

(30) Foreign Application Priority Data
Mar. 31, 2008 (IN) .............................. 792/CHE/2008

(51) Int. Cl.
*H04W 4/00* (2009.01)
(52) U.S. Cl. .................. 455/435.1; 455/411; 455/414.1; 455/432.2; 455/433; 455/466; 370/315; 370/328; 370/390; 370/401; 370/465
(58) Field of Classification Search .................. 370/312, 370/328, 390, 401, 465; 455/411, 414.1, 455/432.2, 433, 435.1, 466
See application file for complete search history.

(56) References Cited

U.S. PATENT DOCUMENTS

| 2007/0094691 A1 | 4/2007 | Gazdzinski | |
|---|---|---|---|
| 2008/0273704 A1* | 11/2008 | Norrman et al. | 380/278 |
| 2008/0274735 A1* | 11/2008 | Choksi et al. | 455/432.2 |
| 2009/0191844 A1* | 7/2009 | Morgan et al. | 455/411 |

FOREIGN PATENT DOCUMENTS

| WO | WO 2007/080399 | 7/2007 |
|---|---|---|
| WO | WO 2007/140834 | 12/2007 |
| WO | WO 2008/004106 | 1/2008 |

OTHER PUBLICATIONS

PCT/ISA/237 Written Opinion issued on PCT/KR2009/001629 (3 pp.).

* cited by examiner

*Primary Examiner* — Kamran Afshar
*Assistant Examiner* — Yousef Rod
(74) *Attorney, Agent, or Firm* — The Farrell Law Firm, P.C.

(57) ABSTRACT

A method and system for registration with a broadcast server is provided. A request from a smartcard terminal for registration is received and the smartcard terminal is authenticated based on the request. Further, A specific key material, Ks_NAF, is generated in response to the request. At least one of registering the smartcard terminal with the Internet Protocol (IP) multimedia subsystem (IMS) server and with the broadcast server simultaneously, and registering the smartcard terminal with the IMS server and subsequently with the broadcast server through the IMS server, is performed. At least one of notifying the IMS server of status of the registration by the broadcast server, and notifying the broadcast server of the status of the registration by the IMS server, is performed. The system includes a smartcard terminal for sending a request for registration, a key generator for generating a Ks_NAF, and an IMS server and a broadcast server for authentication and security association establishment with the smartcard terminal using the Ks_NAF.

12 Claims, 8 Drawing Sheets

METHOD AND SYSTEM FOR REGISTERING A SMARTCARD TERMINAL WITH A BROADCAST SERVER

PRIORITY

This patent application claims priority under 35 U.S.C. §119(a) to Indian provisional patent application number 792/CHE/2008, filed on Mar. 31, 2008, and its corresponding non-provisional patent application filed on Mar. 9, 2009, the contents of which are incorporated herein by reference.

BACKGROUND OF THE INVENTION

1. Field of the Invention

The present invention relates generally to the field of an Internet Protocol (IP) based Multimedia Sub-system (IMS), and more particularly, to a method and a system for registering a smartcard terminal with a broadcast server.

2. Description of the Related Art

A terminal, for example, a mobile device, connects to an Internet Protocol (IP) based Multimedia Sub-system (IMS) to enable an IP service. The IMS authenticates the terminal and then registers the terminal to provide the IP service. The IMS sub-system is also capable of providing Open Mobile Alliance (OMA) Broadcast services, in which the terminal connects to the broadcast system. However, a separate authentication and registration procedure is performed during this process. The separate registration and authentication procedure leads to an inefficient utilization of the resources. Further, the separate registration also results in inefficiency with respect to cost. Moreover, every time a network service is required or re-registration needs to be performed, the resource utilization and time taken for the separate registration also increases. Thus, the latency is increased while establishing the security associations of the terminal with the IMS subsystem or the broadcast system.

SUMMARY OF THE INVENTION

The present invention has been made to address at least the above problems and/or disadvantages and to provide at least the advantages described below. Accordingly, an aspect of the present invention provides a method and system for registration with a Broadcast server.

According to one aspect of the present invention a method for registration with a Broadcast server is provided. A request is received from a smartcard terminal for registration with at least one of an Internet Protocol (IP) based Multimedia Sub-system (IMS) server and a broadcast server. The smartcard terminal is authenticated based on request. A Generic Bootstrapping Architecture (GBA) Network Application Function (NAF) generates specific key material Ks_NAF in response to the request. At least one of registering the smartcard terminal with the IMS server and with the broadcast server simultaneously, and registering the smartcard terminal with the IMS server and subsequently with the broadcast server through the IMS server, is performed. At least one of notifying the IMS server of status of the registration by the broadcast server, and notifying the broadcast server of the status of the registration by the IMS server, is performed.

According to another aspect of the present invention a Broadcast server is provided that includes a smartcard terminal for sending a request for registration. The system includes a key generator for generating a Ks_NAF, and an IP multimedia subsystem (IMS) server for authentication and security association establishment with the smartcard terminal using the Ks_NAF. The system also includes a broadcast server for registering the smartcard terminal through the IMS server by one of requesting and receiving the Ks_NAF from the IMS server.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF THE EMBODIMENTS OF THE INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present disclosure described herein provide a method and system for registering with a broadcast server.

Figure 1:
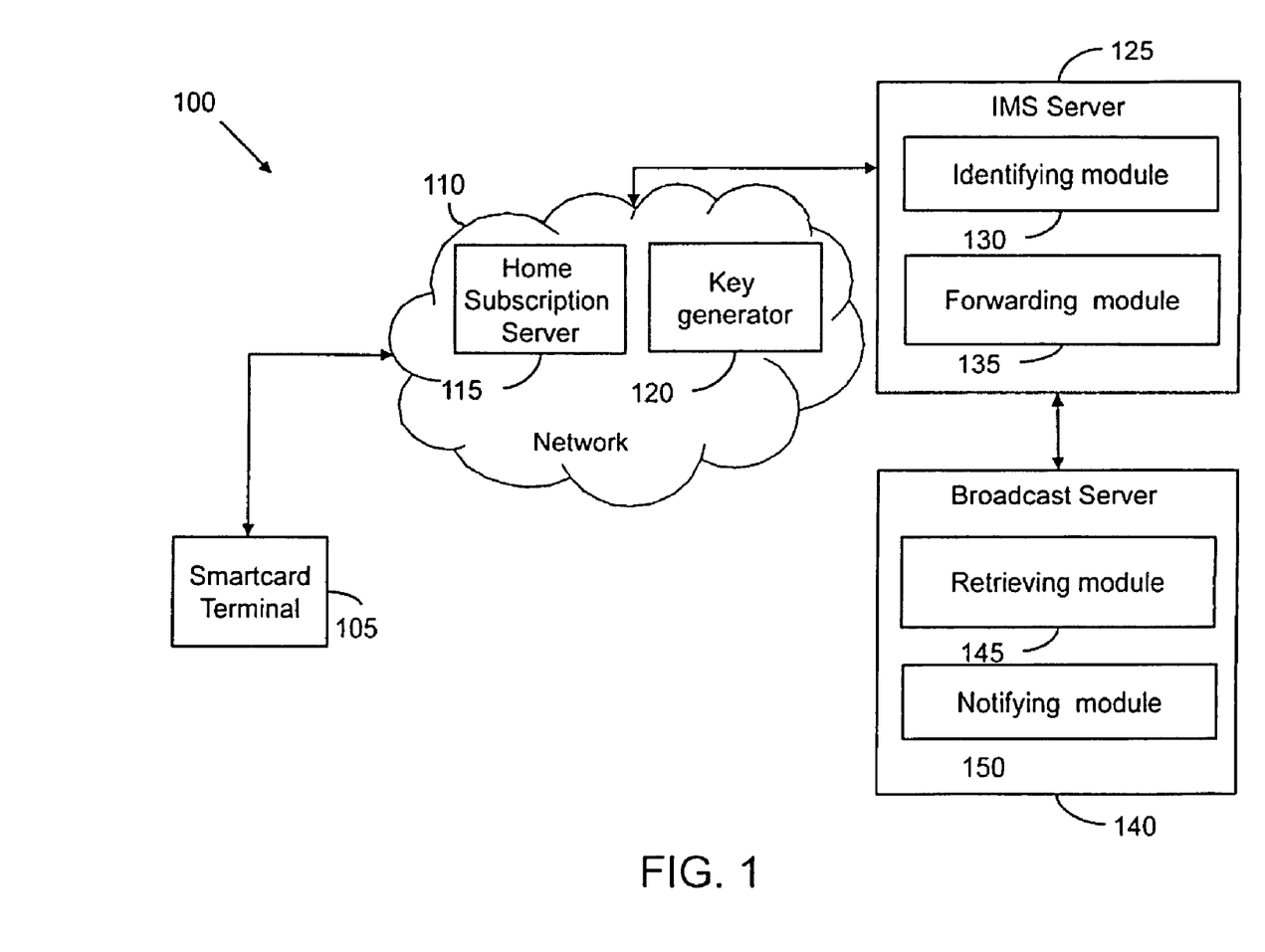
FIG. 1 is a block diagram of a smartcard-server environment, in accordance with which various embodiments of the present invention can be implemented.

FIG. 1 is a block diagram of a smartcard-server environment 100, in accordance with which various embodiments of the present invention can be implemented. The environment 100 includes a smartcard terminal 105. Further, the smartcard terminal 105 includes a smart card. The smart card corresponds to a chip card or an Integrated Circuit Card (ICC). The smartcard terminal 105 corresponds to an electronic device. Examples of the electronic device include, but are not limited to, a computer, a laptop, a mobile device, a processing unit, a palmtop, and a Personal Digital Assistant (PDA).

The smartcard terminal 105 sends a request for registration to an IMS server 125 through a network 110. Examples of the network 110 include, but are not limited to, a Session Initiation Protocol (SIP) based system. The IMS server 125 provides IP multimedia services. The IMS server 125 uses internet protocols, for example, SIP. The SIP is an application layer control protocol used for establishing and terminating sessions with one or more participants. The services facilitated by the IMS server 125 include, but are not limited to, service control, routing, registration, SIP compression and quality of service support.

The IMS server 125 authenticates the smartcard terminal 105 based on the request for registration received from the smartcard terminal 105. The environment 100 also includes a key generator 120 for generating a Ks_NAF in response to receipt of the request by the IMS server 125. The smartcard terminal 105 is subscribed for broadcast services. The IMS server 125 checks subscription of the smartcard terminal for broadcast services. The generation of the Ks_NAF is based on GBA procedure. The GBA is a technology used to authenticate a user using the smartcard terminal 105, for broadcast services. Further, the GBA verifies a user identity in the smart card of the smartcard terminal 105 by utilizing information stored in a Home Subscription Server (HSS) 115. The HSS 115 stores user profiles, generates authentication vectors for the network to perform authentication, and authorization of a user using the smartcard terminal 105. The HSS 115 also maintains the subscription profile of the smartcard terminal.

In one embodiment of the present invention, a Session Management Key (SMK) is generated by the key generator 120 if the smartcard terminal 105 subscribes for OMA broadcast services.

The smartcard terminal 105 is then registered with the IMS server 125 and the registration details of the smartcard terminal 105 are updated in the HSS 115. The smartcard terminal 105 can also request for registration with a broadcast server 140 through the IMS server 125. Examples of the broadcast server 140 include, but are not limited to, a mobile Broadcast services enabler suite (BCAST) server and a Multimedia Broadcast Multicast Service (MBMS) server. The broadcast server 140 functions as an application server. An application server hosts and executes services in the IMS environment.

The IMS server 125 includes an identifying module 130 and a forwarding module 135. The identifying module 130 identifies a portion of the registration request associated with the broadcast server 140. The Ks_NAF is used for registering the smartcard terminal 105 with the broadcast server 140. The forwarding module 135 forwards the portion associated with the broadcast server 140 to the broadcast server 140. The portion associated with the broadcast server 140 can include, but is not limited to, the Ks_NAF, network application function identifier associated with the smartcard terminal 105, and a service payload request.

The portion is received by the broadcast server 140. The broadcast server 140 can receive or request for the Ks_NAF from the IMS server 125. Communication between the IMS server 125 and the broadcast server 140 is based on SIP.

The broadcast server 140 validates the Ks_NAF obtained from the IMS server 125. The smartcard terminal 105 is then registered with the broadcast server 140 and the registration details are updated with the HSS 115.

The broadcast server 140 includes a notifying module 150 for notifying the status of the registration to the IMS server 125.

In some embodiments, the IMS server 125 and the broadcast server 140 together form a broadcast system.

The IMS server 125 transmits the Ks_NAF to the broadcast server 140.

The broadcast server 140 includes a retrieving module 145 for retrieving the Ks_NAF from the key generator 120. The Ks_NAF generated by the key generator 120 is used to authenticate and register the smartcard terminal 105 with the broadcast server 140 through the IMS server 125. The registration details of the smartcard terminal 105 are then updated with the HSS 115.

In some embodiments of the present invention, the IMS server 125 and the broadcast server 140 together form a broadcast server.

The environment 100 can include various other elements in addition to or instead of those shown in FIG. 1. For example, the IMS server 125 can include an Interrogating-Call Session Control Function (I-CSCF) layer, a proxy CSCF layer and a serving CSCF layer, and the broadcast server 140 can include a Broadcast Service Distribution/Application (BSD/A), a Broadcast Subscription Management (BSM), and a Broadcast Multicast Service Center (BM-SC).

In an additional embodiment of the present invention, the functions of the IMS server 125 are performed by the serving CSCF layer.

In further embodiments of the present invention, the functions of the application server 135 are performed by the BSD/A, the BM-SC and the BSM.

Figure 2:
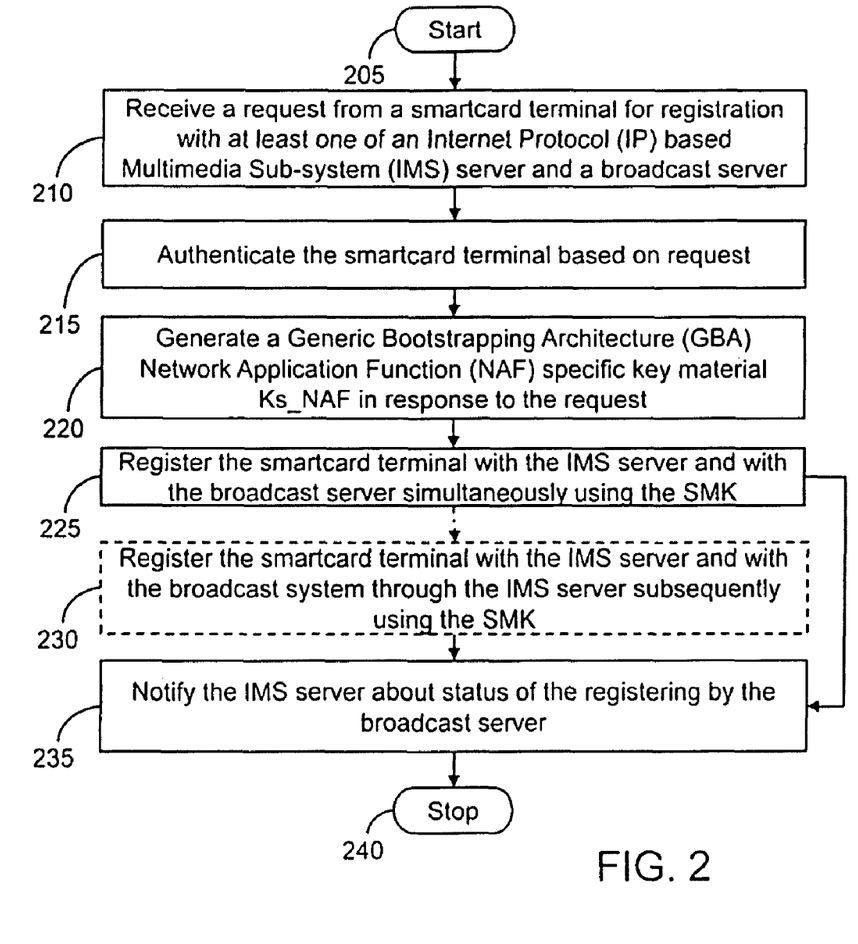
FIG. 2 is a flowchart illustrating a method for registration with a Broadcast server, in accordance with an embodiment of the present invention.

FIG. 2 is a flowchart illustrating a method for registration with a Broadcast server for a smart card profile, in accordance with an embodiment of the present invention.

The methodology begins at step 205.

At step 210, a request is received from a smartcard terminal for registration with at least one of an IMS server and a broadcast server.

The smartcard terminal can request registration with the IMS server to obtain one or more services, for example, Push-to-talk over Cellular (PoC) services, provided by the IMS server.

Similarly, the smartcard terminal can request registration with the broadcast server through the IMS server to obtain the one or more services provided by the broadcast server, for example, on-demand video services.

At step 215, the smartcard terminal is authenticated based on the request. A user owns a user identity on the HSS. The authentication is performed through exchange of a key located in a smartcard of the smartcard terminal and a key generated by the BSF. The smartcard terminal and BSF mutually authenticate based on the exchange. The authentication process uses Hyper Text Transfer Protocol (HTTP) Digest_Access_Authentication (AKA) protocol.

At step 220, a GBA NAF specific key material Ks_NAF is generated in response to the request. The Ks_NAF is generated by executing the GBA. The KS_NAF is represented as "Ks_NAF". The Ks derived during GBA procedure is used to derive Ks_NAF.

At step 225, a smartcard terminal is registered with an IMS server and with a broadcast server simultaneously.

A portion request associated with the broadcast server is identified and forwarded to the broadcast sever. If the portion includes the broadcast service registration, the IMS server transmits the Ks_NAF in a SIP message to the broadcast server through a SIP message. The Ks_NAF can be transmitted to the broadcast server prior to the registration with the IMS server for facilitating simultaneous registration of the smartcard terminal with the IMS server and the broadcast server.

The BSM is located in the broadcast server. The Ks_NAF is validated by the broadcast server. The smartcard terminal is then registered with the IMS server and the broadcast server simultaneously.

An acknowledgement of the registration can be sent to the smartcard terminal.

The registration with the broadcast server includes establishing a security session for communication between the smartcard terminal and the broadcast server.

In one embodiment, step 225 can be bypassed and step 230 can be performed.

At step 230, the smartcard terminal is registered with the IMS server and subsequently with the application server through the IMS server.

The smartcard terminal sends a request to the IMS server for registration. The request includes the user identity required for authentication by SIP based signaling. The IMS server then responds by signaling an acknowledgement of IMS registration to the smartcard terminal. The smartcard terminal then requests registration with the broadcast system.

The broadcast server retrieves the Ks_NAF from the IMS server if the request is forwarded to the broadcast server directly. The IMS server can also forward the Ks_NAF directly to the broadcast server if the request is forwarded to the IMS server. Once, the Ks_NAF is received and validated by the broadcast server, the smartcard terminal and the broadcast server can communicate directly. Authentication of the smartcard terminal with the broadcast server can be skipped as the smartcard terminal has been previously authenticated with the IMS server. An acknowledgement of the broadcast registration is sent to the smartcard terminal.

At the end of step 225 and step 230, the IMS and the Broadcast server updates the status of the registration in a home subscription server.

At step 235, the IMS server is notified about the status of the registration with the broadcast server by the broadcast server. Notification can be performed using the SIP messages.

The broadcast server is notified about the status of the registration with the IMS server by the IMS server. Notification can be performed using the SIP messages.

The methodology terminates at step 240.

In some embodiments of the present invention, one or more of the steps described above can be implemented using a smartcard terminal. The smartcard terminal includes a bus for communicating information, and a processor coupled with the bus for processing information. The smartcard terminal also includes a memory, for example, a Random Access Memory (RAM), coupled to the bus for storing information required by the processor. The memory can be used for storing temporary information required by the processor. The smartcard terminal further includes a Read Only Memory (ROM) coupled to the bus for storing static information required by the processor. A server storage unit, for example a magnetic disk, hard disk or optical disk, can be provided and coupled to bus for storing information.

The smartcard terminal can be coupled via the bus to a display, for example a Cathode Ray Tube (CRT) or Liquid Crystal Display (LCD), for displaying information. An input device, including various keys, is coupled to the bus for communicating information to the processor. In some embodiments, cursor control, for example, a mouse, a trackball, a joystick, or cursor direction keys, for communicating information to the processor and for controlling cursor movement on the display can also be present.

In an embodiment of the present invention, the steps of FIG. 2 described above are performed by the smartcard terminal using the processor. The information can be read into the memory from a machine-readable medium, for example, the server storage unit. In alternative embodiments of the present invention, hard-wired circuitry can be used in place of or in combination with software instructions to implement various embodiments of the present invention.

The term machine-readable medium can be defined as a medium providing data to a machine to enable the machine to perform a specific function. The machine-readable medium can be a storage media. Storage media can include non-volatile media and volatile media. The server storage unit can be a non-volatile media. The memory can be a volatile media. All such media must be tangible to enable the instructions carried by the media to be detected by a physical mechanism that reads the instructions into the machine.

Examples of the machine readable medium includes, but are not limited to, a floppy disk, a flexible disk, hard disk, magnetic tape, a CD-ROM, optical disk, punch cards, paper tape, a RAM, a PROM, EPROM, and a FLASH-EPROM.

The machine readable medium can also include online links, download links, and installation links providing the information to the processor.

The smartcard terminal also includes a communication interface coupled to the bus for enabling data communication. Examples of the communication interface include, but are not limited to, an Integrated Services Digital Network (ISDN) card, a modem, a Local Area Network (LAN) card, an infrared port, a Bluetooth port, a zigbee port, and a wireless port.

In additional embodiments of the present invention, the processor can include one or more processing units for performing one or more functions of the processor. The processing units are hardware circuitry performing specified functions.

Various embodiments of the present invention provide an SIP interface between the IMS server and the broadcast server to be re-used. Further, the broadcast services, which use SIP-based signaling can be converged. The authentication time is optimized in establishing the security association between the smartcard terminal and the broadcast system.

Figure 3:
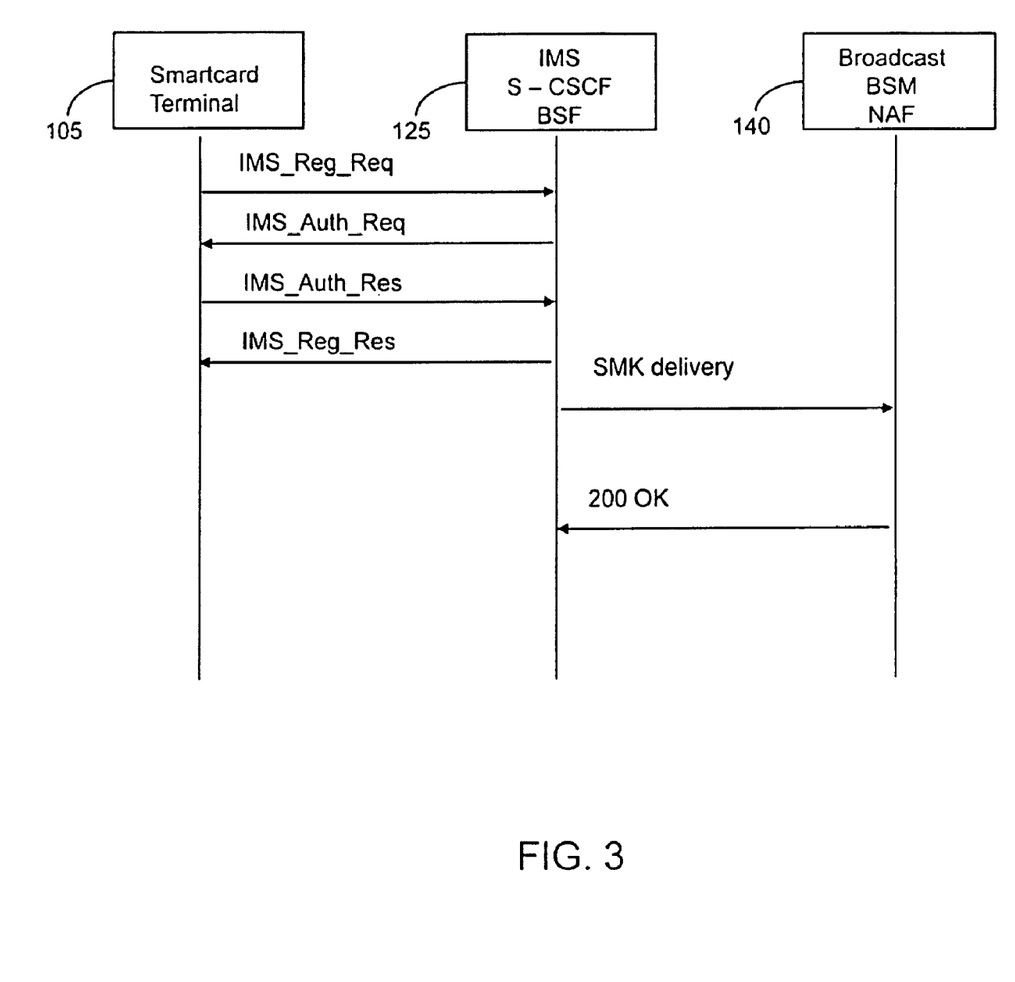
FIG. 3 is a flow diagram representing a flow of messages between a smartcard terminal, an IMS server and a Broadcast server for registration of the smartcard terminal with the IMS server and subsequent registration of the smartcard terminal with the broadcast server, in accordance with an embodiment of the present invention.

FIG. 3 is a flow diagram representing a flow of messages between a smartcard terminal 105, an IMS server 125 and a broadcast server 140 for registration of the smartcard terminal 105 with the IMS server 125 and subsequent registration of the smartcard terminal 105 with the broadcast server 140, in accordance with an embodiment of the present invention.

The smartcard terminal 105 performs the GBA procedure with the BSF. The flow of details in the SIP Messages for subsequent registration of the smartcard terminal 105 with both the IMS server and an application server is explained below:

IMS_Reg_Req: The smartcard terminal 105 sends the request for IMS registration to the S-CSCF. The message carries the user identity information needed for GBA. The IP Multimedia Private Identity (IMPI) value used for SIP registration is re-used here. The REGISTER method includes:

---

REGISTER <domain name> SIP /2.0
Via:
Forwards:
From:
To:

-continued

```
Authorization: .... Username= "user identity info for GBA/SIP
registration" .....
Require: bcast_ext_profile=BCAST_EXT_PROFILE;
bcast_ext_scard= "NAF_ID ofthe NAF with which the terminal
wishes to register"
  .
  .
  .
Content-Length: 0
```

IMS_Auth_Req: S-CSCF sends back the Authentication Response to the smartcard terminal 105. The Random Challenge (RAND) and the Authentication Token (AUTN) are communicated in this message. The authentication challenge message includes:

```
          SIP/2.0 401 Authorization
          .
          WWW-Authenticate:
          .
          Content-Length: 0
```

IMS_Auth_Res: The smartcard terminal 105 sends the Authentication Response to the S-CSCF. The REGISTER method includes:

```
REGISTER <domain name> SIP /2.0
Via:
Forwards:
From:
To:
Authorization: ......... Username= "user identity info for GBA/SIP
registration"nonce = "nonce value" response = "response value"
  .
  .
  .
Content-Length: 0
```

IMS_Reg_Res: The S-CSCF responds back with the '200 OK' suggesting successful IMS registration and successful GBA run.

```
          SIP/2.0 200 OK
          .
          Content-Length: 0
```

At this point, the GBA key has been extracted between the smartcard terminal 105 and S-CSCF and Ks is established between the S-CSCF or the BSF and the smartcard terminal 105. Further, the S-CSCF or the BSF generates the Ks_NAF with the Ks that has been established and the NAF_ID that has been received in the initial registration request message.

SMK Delivery: The S-CSCF generates and delivers the Ks_NAF to the broadcast server 140. This Ks_NAF is the SMK for all further communications between the BSM and the smartcard terminal 105.

200 OK: After the successful receiving the SMK from the BSF, the BSM sends back a 200 OK message back to the BSF.

Figure 4:
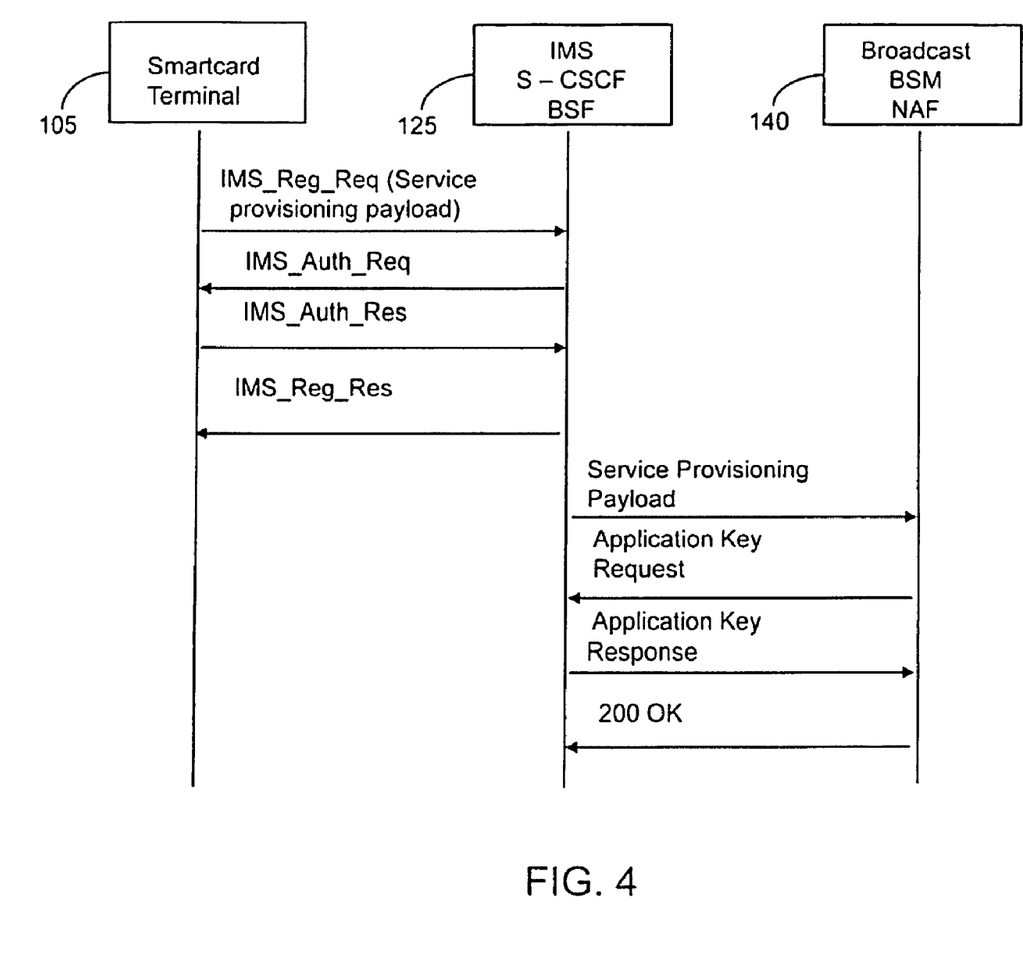
FIG. 4 is a flow diagram representing a flow of messages between a smartcard terminal, an IMS server and a Broadcast server for registration of the smartcard terminal with the IMS server and subsequent registration of the smartcard terminal with the broadcast server, in accordance with another embodiment of the present invention.

FIG. 4 is a flow diagram representing a flow of messages between a smartcard terminal 105, an IMS server 125 and a broadcast server 140 for registration of the smartcard terminal 105 with the IMS server 125 and subsequent registration of the smartcard terminal 105 with the broadcast server 140, in accordance with another embodiment of the present invention.

The flow of details in the SIP Messages for subsequent registration of the smartcard terminal 105 with both the IMS server 125 and an broadcast server 140 is explained below:

IMS_Reg_Req: The smartcard terminal 105 sends an IMS_Reg_Req message for IMS registration with a S-CSCF. Further, the IMS_Reg_Req carries the service provisioning payload for request of subscription to a service. The SIP method used is REGISTER with extensions. The S-CSCF forwards the service provisioning payload to the broadcast server 140. The REGISTER method includes:

```
REGISTER <domain name> SIP/2.0
Via:
Forwards:
  .
.Content-Length: <size of the service provisioning message>
Require: bcast_ext_profile=BCAST_EXT_PROFILE;
bcast_ext_scard= "NAF_ID of the NAF with which the terminal
wishes to register"
Content-Type: "application/vnd.oma.bcast.sprov+xml"
<Service Provisioning Message>
```

IMS_Auth_Req: The S-CSCF sends back an Authentication Response to the smartcard terminal 105. The RAND and the AUTN are communicated in the IMS_Auth_Req message. The authentication challenge message includes:

```
          SIP/2.0 401 Authorization
          .
          WWW-Authenticate:
          .
          Content-Length: 0
```

IMS_Auth_Res: The smartcard terminal 105 sends an Authentication Response to the S-CSCF. The REGISTER method includes:

```
REGISTER <domain name> SIP /2.0
Via:
Forwards:
From:
To:
Authorization: ......... Username= "user identity info for GBA/SIP
registration"
nonce = "nonce value" response = "response value"
  .
  .
  .
Content-Length: 0
```

IMS_Reg_Res: The S-CSCF responds back with the '200 OK' suggesting successful IMS registration and successful GBA run.

Service Request Payload: At the end of establishment of Ks between the BSF and the smartcard terminal 105, the BSF forwards a service provisioning message to the BSM.

Application Key Request: The service provisioning payload is received from the BSF by the BSM. The BSM sends an SMK Request to the BSF. The SMK request contains a NAF_ID corresponding to the BSM. The SMK request is a GBA request whereby the NAF specifies its corresponding NAF_ID and requests for a Ks_NAF.

Application Key Response: The BSF generates the Ks_NAF and sends to the BSM. The Ks_NAF functions as the SMK for future communications between the BSM and the smartcard terminal 105.

200 OK: The BSM responds to the BSF with a 200 OK to signify the successful reception of the SMK.

Figure 5:
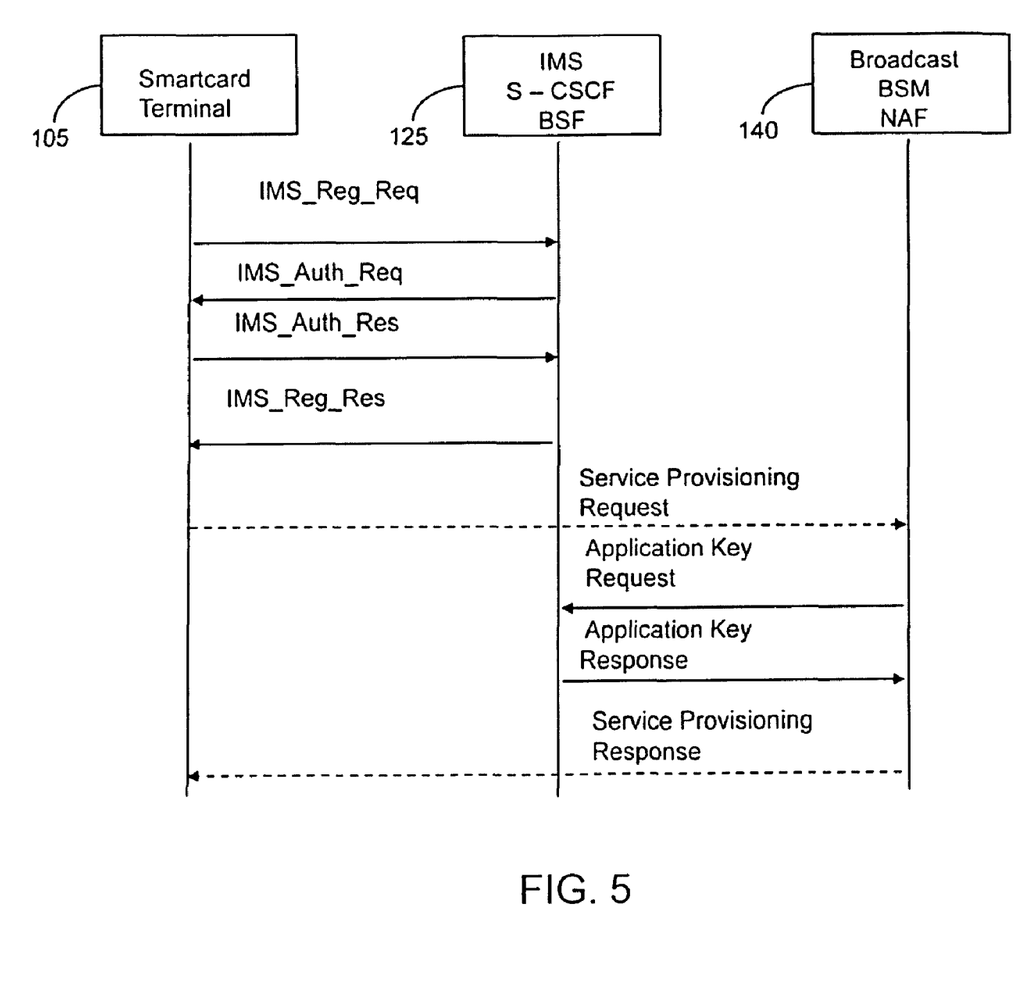
FIG. 5 is a flow diagram representing a flow of messages between a smartcard terminal, an IMS server and a Broadcast server for registration of the smartcard terminal with the IMS server and subsequent registration of the smartcard terminal with the broadcast server, in accordance with yet another embodiment of the present invention.

FIG. 5 is a flow diagram representing a flow of messages between a smartcard terminal 105, an IMS server 125 and a broadcast server 140 for registration of the smartcard terminal 105 with the IMS server 125 and subsequent registration of the smartcard terminal 105 with the broadcast server 140, in accordance with yet another embodiment of the present invention.

The flow of details in the SIP Messages for subsequent registration of the smartcard terminal 105 with both the IMS server 125 and an broadcast server 140 is explained below:

IMS_Reg_Req: The smartcard terminal 105 sends a request for IMS registration to a S-CSCF. The IMS_Reg_Req message carries the user identity information needed for GBA. The IMPI value used for SIP registration is re-used. The REGISTER method includes:

```
REGISTER <domain name> SIP /2.0
Via:
Forwards:
From:
To:
Authorization: .... Username= "user identity info for GBA/SIP
registration" .....
.
.
.
Content-Length: 0
```

IMS_Auth_Req: The S-CSCF sends back an Authentication Response to the smartcard terminal 105. The RAND and the AUTN are communicated in the IMS_Auth_Req message. The authentication challenge message includes:

```
              SIP/2.0 401 Authorization
              .
              WWW-Authenticate:
              .
              Content-Length: 0
```

IMS_Auth_Res: The smartcard terminal 105 sends an Authentication Response to the S-CSCF. The Authorization Response goes from the smartcard terminal 105 to the S-CSCF. The REGISTER method includes:

```
REGISTER <domain name> SIP /2.0
Via:
Forwards:
From:
To:
Authorization: ......... Username= "user identity info for GBA/SIP
registration"
nonce = "nonce value" response = "response value"
.
.
.
Content-Length: 0
```

IMS_Reg_Res: The S-CSCF responds back with the '200 OK' signifying a successful IMS registration and successful GBA run.

```
              SIP/2.0 200 OK
              .
              .
              Content-Length: 0
```

The GBA run between the smartcard terminal 105 and the BSF (can be co-located with S-CSCF) would be completed by now and Ks has been established between the BSF and the smartcard terminal 105.

Service Provisioning Req: The smartcard terminal 105 tries to contact the broadcast server 140 directly. At this point, the Ks_NAF is transmitted to the BSM from the S-CSCF. Further, the smartcard terminal 105 sends a BCAST Service Request including a NAF_ID corresponding to the BSM.

Application Key Req: The BSM sends the NAF_ID through a SIP message to retrieve the Ks_NAF from the BSF.

Application Key Res: The BSF sends a response with the Ks_NAF to the BSM through a SIP message.

Service Provisioning Res: The BSM receives the Ks_NAF from the BSF. Further, the smartcard terminal 105 and the BSM communicate directly.

Figure 6:
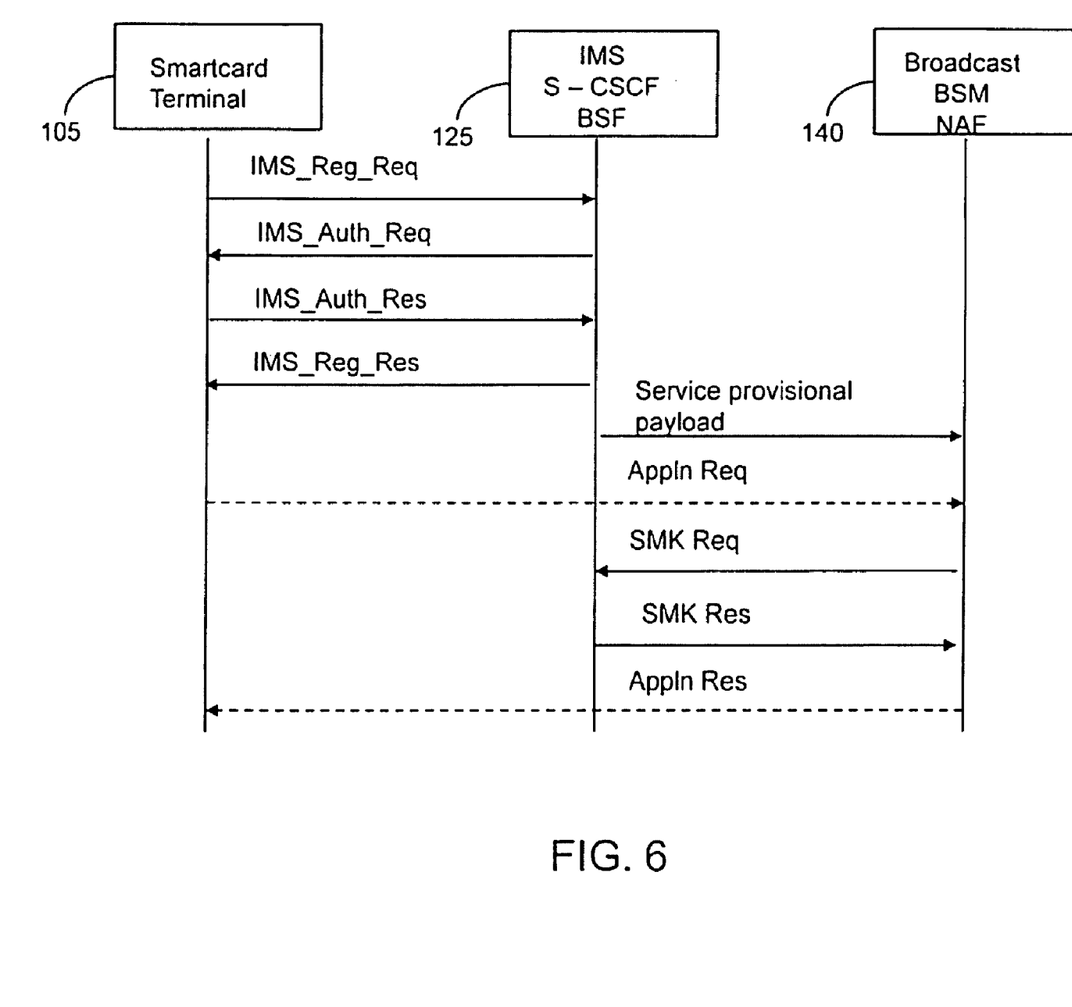
FIG. 6 is a flow diagram representing a flow of messages between a smartcard terminal, an IMS server and a Broadcast server for simultaneous registration of the smartcard terminal with the IMS server and the broadcast server, in accordance with an embodiment of the present invention.

FIG. 6 is a flow diagram representing a flow of messages between a smartcard terminal 105, an IMS server 125 and a broadcast server 140 for simultaneous registration of the smartcard terminal 105 with the IMS server 125 and the broadcast server 140, in accordance with one embodiment of the present invention.

The flow of details in the SIP Messages for simultaneous registration of the smartcard terminal 105 with both the IMS server 125 and an application server is explained below:

IMS_Reg_Req: The smartcard terminal 105 sends the request for IMS server 125 registration to the S-CSCF of the IMS server 125. This message carries the user identity information needed for GBA. The IMPI value used for SIP registration is re used here. The S-CSCF checks the subscription of the smartcard terminal for broadcast services.

IMS_Auth_Req: The S-CSCF of the IMS server 125 sends back the Authentication Response to the smartcard terminal 105.

IMS_Auth_Res: The smartcard terminal 105 sends the Authentication Response to the S-CSCF of the IMS server 125.

IMS_Reg_Res: S-CSCF responds back with the '200 OK' suggesting successful IMS registration of the smartcard terminal 105 with the IMS server 125 and successful GBA run. The Ks is derived between S-CSCF or BSF and smartcard terminal 105. Now the S-CSCF or the BSF, generates the Ks_NAF with the established Ks and the network application function identity (NAF_ID) that it has received in the initial registration request message.

Service Request Payload: On establishment of Ks_NAF between the BSF and the smartcard terminal 105, the S-CSCF forwards the service provisioning message to the BSM for service authorization.

Appln Req: When the smartcard terminal 105 tries to contact the Application Server—BSM, then the KS_NAF needs to be communicated to the BSM from the S-CSCF or BSF of the IMS server 125.

SMK Req: The BSM gives its NAF_ID to retrieve the SMK from the BSF or the S-CSCF through a SIP method.

SMK Res: The BSF or S-CSCF sends the response as SMK to the BSM and the hence the key SMK is communicated to BSM.

Appln Res: After the key has been acquired by the BSM, any further communications can be carried out between the smartcard terminal 105 and the BSM directly or through the IMS network.

Figure 7:
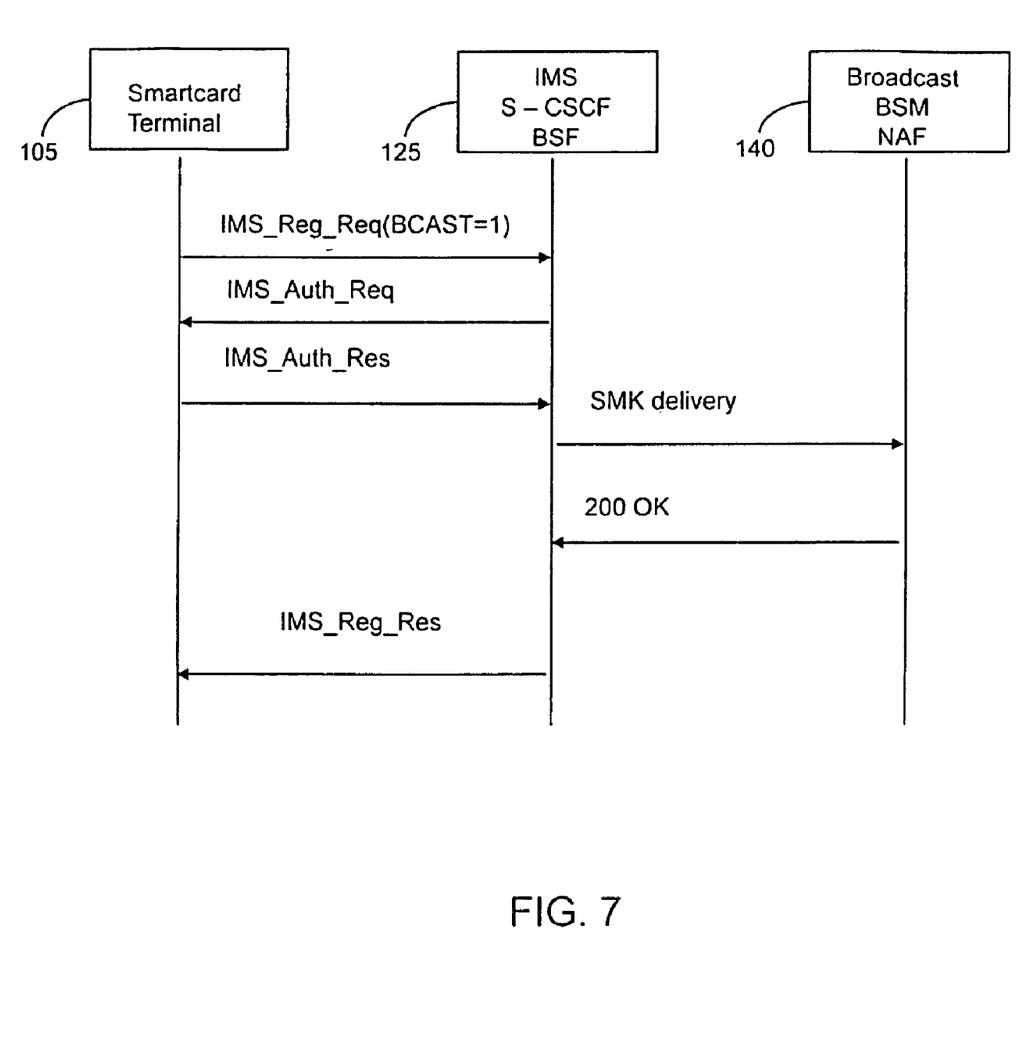
FIG. 7 is a flow diagram representing a flow of messages between a smartcard terminal, an IMS server and a Broadcast server for simultaneous registration of the smartcard terminal with the IMS server and the broadcast server, in accordance with another embodiment of the present invention.

FIG. 7 is a flow diagram representing a flow of messages between a smartcard terminal 105, an IMS server 125 and a broadcast server 140 for simultaneous registration of the smartcard terminal 105 with the IMS server 125 and the broadcast server 140, in accordance with another embodiment of the present invention.

The flow of details in the SIP Messages for simultaneous registration of the smartcard terminal 105 with both the IMS server 125 and an broadcast server 140 is explained below:

IMS_Reg_Req: The smartcard terminal 105 sends the request for IMS server registration to a S-CSCF. The IMS_Reg_Req message carries a user identity information needed for GBA. An IMPI value used for SIP registration is re-used. The REGISTER method includes:

```
REGISTER <domain name> SIP /2.0
Via:
Forwards:
From:
To:
Authorization: .... Username= "user identity info for GBA/SIP
registration" .....
Require: bcast_ext_profile=BCAST_EXT_PROFILE;
bcast_ext_scard= "NAF_ID of the NAF with which the smartcard
terminal 105 wishes to register"
.
.
.
Content-Length: 0
```

IMS_Auth_Req: The S-CSCF sends back an Authentication Response to the smartcard terminal 105. Further, the RAND and the AUTN are communicated. The authentication challenge message includes:

```
SIP/2.0 401 Authorization
.
WWW-Authenticate:
.
Content-Length: 0
```

IMS_Auth_Res: The smartcard terminal 105 sends an Authentication Response to the S-CSCF. The Authorization Response is transmitted from the smartcard terminal 105 to the S-CSCF. The REGISTER method includes:

```
REGISTER <domain name> SIP /2.0
Via:
Forwards:
From:
To:
Authorization: ......... Username= "user identity info for GBA/SIP
registration"
nonce = "nonce value" response = "response value"
.
.
.
Content-Length: 0
```

SMK Delivery: The BSF receives the authentication response packet and the Ks is generated. The BSF generates and transmits a Ks_NAF to the BSM.

200 OK: The BSM responds with the 200 OK after receiving the Ks_NAF.

IMS_Reg_Res: The BSF responds back with the 200 OK signaling the successful completion of the IMS registration and broadcast registration.

Figure 8:
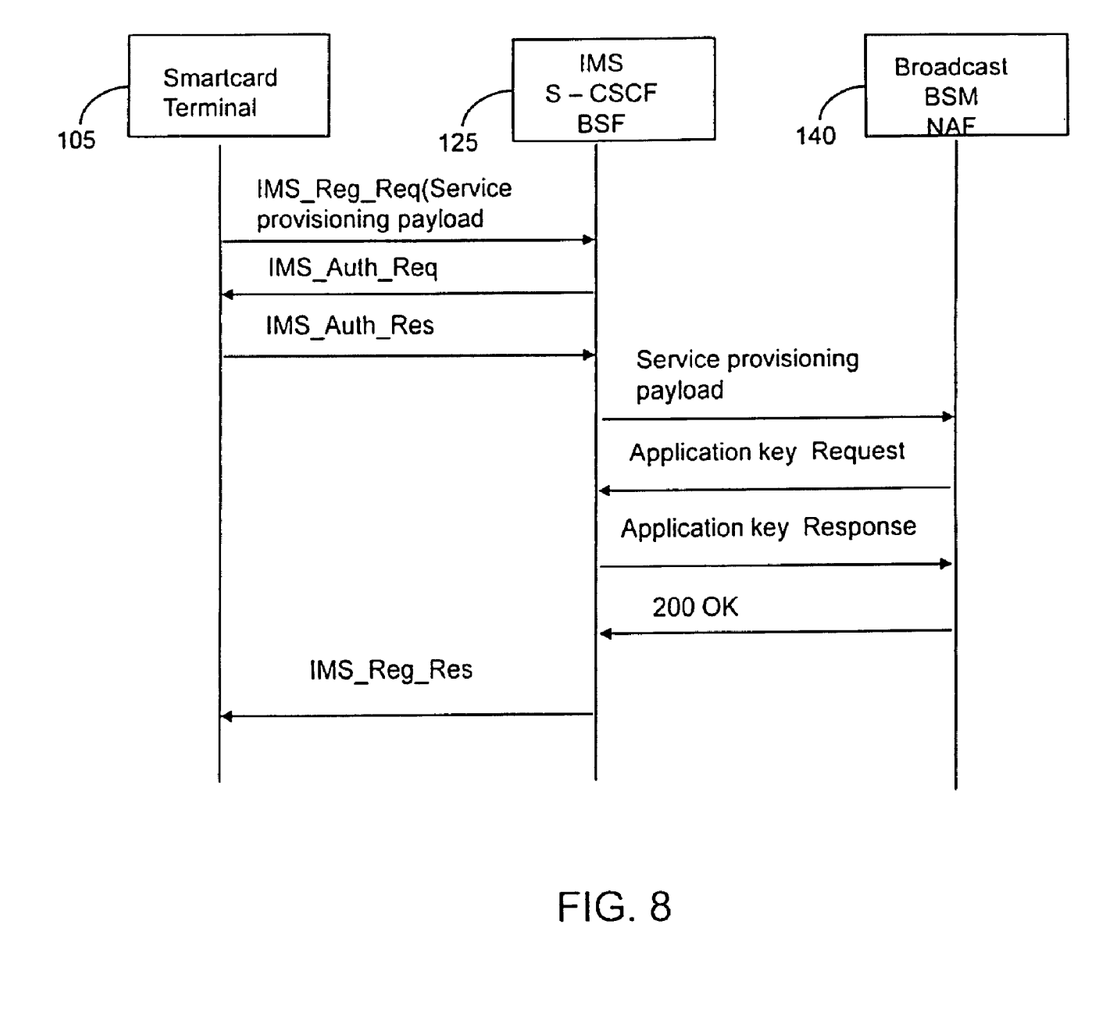
FIG. 8 is a flow diagram representing a flow of messages between a smartcard terminal, an IMS server and a Broadcast server for simultaneous registration of the smartcard terminal with the IMS server and the broadcast server, in accordance with yet another embodiment of the present invention.

FIG. 8 is a flow diagram representing a flow of messages between a smartcard terminal 105, an IMS server 125 and a broadcast server 140 for simultaneous registration of the smartcard terminal 105 with the IMS server 125 and the broadcast server 140, in accordance with yet another embodiment of the present invention.

The flow of details in the SIP Messages for simultaneous registration of the smartcard terminal 105 with both the IMS server 125 and an broadcast server 140 is explained below:

IMS_Reg_Req: The smartcard terminal 105 sends an IMS_Reg_Req message for IMS registration with a S-CSCF. Further, the IMS_Reg_Req carries the service provisioning payload for request of subscription to a service. The SIP method used is REGISTER with extensions. The S-CSCF forwards the service provisioning payload to the broadcast server 140. The REGISTER method includes:

```
REGISTER <domain name> SIP/2.0
Via:
Forwards:
Content-Length: <size of the service provisioning message>
Require: bcast_ext_profile=BCAST_EXT_PROFILE;
bcast_ext_scard= "NAF_ID of the NAF with which the terminal
wishes to register"
Content-Type: "application/vnd.oma.bcast.sprov+xml"
<Service Provisioning Message>
```

IMS_Auth_Req: The S-CSCF sends back an Authentication Response to the smartcard terminal 105. The RAND and the AUTN are communicated in the IMS_Auth_Req message. The authentication challenge message includes:

```
SIP/2.0 401 Authorization
.
WWW-Authenticate:
.
Content-Length: 0
```

IMS_Auth_Res: The smartcard terminal 105 sends an Authentication Response to the S-CSCF. The Authorization Response goes from the smartcard terminal 105 to the S-CSCF. The REGISTER method includes:

```
REGISTER <domain name> SIP /2.0
Via:
Forwards:
From:
To:
Authorization: ......... Username= "user identity info for GBA/SIP
registration"
nonce = "nonce value" response = "response value"
.
.
Content-Length: 0
```

Service Request Payload: At the end of establishment of Ks between the BSF and the smartcard terminal 105, the BSF forwards the service provisioning message to the BSM.

Application Key Request: On receiving the payload data from the BSF, the BSM sends an SMK Request to the BSF. This request contains the NAF_ID of the BSM.

Application Key Response: The Ks_NAF is generated by the BSF and it is sent to the BSM. This serves as the SMK for future communications between the BSM and the smartcard terminal 105.

200 OK: After receiving the SMK from the BSF, the BSM responds to the BSF with a 200 OK to signify the successful reception of the SMK.

IMS_Reg_Res: S-CSCF responds back with the '200 OK' suggesting successful IMS registration and broadcast registration.

While the present invention has been shown and described with reference to certain embodiments thereof, it should be understood by those skilled in the art that various changes in form and detail may be made therein without departing from the spirit and scope of the invention as defined in the appended claims.

What is claimed is:

1. A method for smartcard terminal registration in a broadcast server, the method comprising the steps of:
    receiving a request for registration from the smartcard terminal with at least one of an Internet Protocol (IP) based Multimedia Sub-system (IMS) server and a broadcast server;
    authenticating the smartcard terminal based on the request;
    generating a Generic Bootstrapping Architecture (GBA) Network Application Function (NAF) specific key material, Ks_NAF, in response to the request;
    performing at least one of:
        registering the smartcard terminal with the IMS server and with the broadcast server simultaneously; and
        registering the smartcard terminal with the IMS server and subsequently with the broadcast server through the IMS server; and
    notifying the IMS server of a status of the registration by the broadcast server,
    wherein the registration with the broadcast server comprises:
        receiving a registration request at the IMS server;
        identifying a portion of the registration request associated with the broadcast server; and
        forwarding the portion of the registration request to the broadcast server after performing a check based on subscription information in a Home Subscription Server (HSS).

2. The method of claim 1 further comprising:
    notifying the broadcast server of the status of the registration by the IMS server.

3. The method of claim 1, wherein the registration with the broadcast server comprises:
    establishing a security session between the smartcard terminal and the broadcast server.

4. The method of claim 1, wherein the registration is based on Session Initiation Protocol (SIP) messages.

5. The method of claim 1, wherein the broadcast server functions as an application server.

6. The method of claim 1, wherein the registration comprises:
    transmitting the Ks_NAF to the broadcast server from the IMS server through an SIP message; and
    utilizing the Ks_NAF at the broadcast server for smartcard terminal registration.

7. The method of claim 1, wherein the registration comprises:
    retrieving the Ks_NAF by the broadcast server from the IMS server through SIP messages.

8. The method of claim 1 further comprising:
    updating a home subscription server with respect to the registration of the smartcard terminal to at least one of the IMS server and the broadcast server.

9. A system for registration of a smartcard profile in a broadcast server, the system comprising:
    a smartcard terminal with a smartcard for sending a request for registration;
    a key generator for generating a specific key material, Ks_NAF;
    an IP Multimedia Subsystem (IMS) server in communication with the key generator for authentication and security association establishment with the smartcard terminal using the Ks_NAF; and
    a broadcast server for registering the smartcard terminal through the IMS server through at least one of requesting the Ks_NAF from the IMS server and receiving the Ks_NAF from the IMS server,
    wherein the IMS server comprises an identifying module for identifying a portion of a registration request, and
    wherein the portion of the registration request is associated with the broadcast server.

10. The system of claim 9, wherein the IMS server further comprises
    a forwarding module for forwarding the Ks_NAF and the portion of the registration request to the broadcast server.

11. The system of claim 9, wherein the broadcast server functions as an application server.

12. The system of claim 9, wherein the broadcast server comprises:
    a notifying module for notifying the IMS server of a status of the registration; and
    a retrieving module for retrieving the Ks_NAF and the authorization from the IMS server.

* * * * *